United States Patent Office 2,873,480
Patented Feb. 17, 1959

2,873,480

METHOD OF MOLDING FOUNDRY CORE DRIER SUPPORTS

Osborn Ayers, Westfield, and Michael Homiak, Bound Brook, N. J., assignors to Johns-Manville Corporation, New York, N. Y., a corporation of New York No Drawing. Application June 18, 1954
Serial No. 437,866

10 Claims. (Cl. 18—47.5)

This invention relates to molded bodies comprising reinforcing fibers in a matrix of hydrous calcium silicate, and more particularly relates to bodies of such type which are particularly suitable as supports for foundry cores during curing thereof.

Molded bodies formed from a composition comprising staple reinforcing fiber dispersed in a matrix of hydrous calcium silicate have been heretofore proposed and are presently manufactured for various purposes. Primarily such molded bodies are employed as structural panels for services where it is desired that the panel be of light weight and yet of an incombustible nature. Such commercial products are formed by molding an aqueous slurry comprising staple reinforcing fiber, such as asbestos, finely divided lime and finely divided silica to the desired form, then subjecting the thus molded product to steam at elevated temperatures and pressures in order to effect reaction between the lime and silica and develop the hydrous calcium silicate matrix therein, and then drying the body. For structural service conditions, the thus formed bodies have all necessary and desired characteristics. Such products, however, exhibit a disadvantageous characteristic during manufacture in that the molded body has a tendency to expand from its pressed dimensions during the autoclaving procedure. As a result, the ultimately obtained product has dimensions different from those imparted to the body in the mold. While this change in dimension is relatively slight and has little or no effect upon the use of such molded products as structural panels, for some desired services the characteristic is objectionable.

The ultimate composition of molded bodies formed of reinforcing fiber in a matrix of hydrous calcium silicate is admirably suited for service as a pallet to support sand cores used in the foundy industry during the curing thereof. In conventional practice, such sand cores are formed by molding a mixture of sand and a resin binder to the desired form, then curing the resin to firmly bond the sand granules. When initially molded, these cores are not handleable and, hence, they must be supported during the curing operation, which normally comprises baking the core at a temperature sufficiently high to cure the resin. Since the cores, when formed, are molded to the precise dimensions desired in the casting, it is apparent that the core support pallet must be molded to precise dimensions corresponding to the dimensions of the core. Since the heretofore manufactured molded bodies of reinforcing fiber in a hydrous calcium silicate matrix have a tendency to expand to unpredictable degrees during the curing procedure, it has not been possible to mold such bodies to the precise dimensions corresponding to the core to be supported and obtain a product which retains these required dimensions after curing and drying.

Accordingly, it is an object of this invention to provide a procedure for manufacturing precisely molded bodies of reinforcing fiber in a hydrous calcium silicate matrix, which bodies will retain their molded form after curing and drying.

It is another and more specific object of this invention to produce a foundry core support pallet of a suitable inorganic composition molded with dimensions precisely corresponding to those of the core to be supported, and which will retain these dimensions during the formation of the pallet and during the core curing procedure.

This invention will be more fully understood and further objects and advantages thereof will become apparent when reference is made to the hereinafter detailed description of the invention.

In accordance with this invention, precisely dimensioned molded bodies of staple reinforcing fibers in a hydrous calcium silicate matrix are formed by molding an aqueous slurry containing staple reinforcing fiber, finely divided lime and finely divided siliceous aggregate to the form and dimensions desired in the ultimate product, drying the thus molded body to remove approximately 10-50% by volume of the water therein, exposing the partially dried, molded body to steam at elevated temperatures and pressures, preferably at least 75 p. s. i. g., to develop a hydrous calcium silicate matrix therein, and then drying the cured body. When the fiber reinforced calcareous bodies are manufactured in accordance with this procedure, they exhibit characteristics which render them completely suitable for use as core drier pallets. Such treatment minimizes or eliminates the expansion of the body during curing and drying so that the finally obtained dried body will substantially retain the precise dimensions corresponding to the core to be supported as originally imparted to the body during the molding procedure. It has been found that the ultimate bodies formed in accordance with this invention and hence partially dried prior to the autoclaving procedure do not exhibit expansion or contraction in amount sufficient to prevent the core from being placed in its support cavity and properly supported throughout its configuration.

The core drier pallets formed in accordance with the invention may be formed from conventional compositions heretofore employed in the formation of staple fiber reinforced hydrous calcium silicate bodies. Preferably, the composition can comprise approximately 10-70% by weight of staple reinforcing fiber, such as the various suitable grades of asbestos fiber, e. g., amosite, chrysotile, etc., with the remainder of the body comprising finely divided lime and finely divided siliceous aggregate, e. g., diatomaceous earth, quartz, siliceous clay, etc., in a mol ratio of approximately 0.6–1 to 1–1.5. Preferably, the fiber content will comprise approximately 25–50% by weight of the body, and the finely divided lime and siliceous aggregate will be present in the body in approximately equivalent stoichiometric ratios.

As heretofore indicated, it is essential to the invention that the molded body, to which has been imparted in the mold the substantially precise dimensions of the core to be supported, be partially dried prior to the time when the body is subjected to the steam cure. Molded bodies of satisfactory dimensional tolerances can be formed in accordance with this invention by drying the freshly molded product to remove approximately 10-50% by volume of the water present therein. In the preferred embodiment of the invention, however, approximately 15-35% by volume of the water in the molded body is removed. Removal of such amounts of water, prior to the autoclaving of the molded body, results in a product which substantially retains the exact dimensions imparted to the body during the molding procedure.

The following is an example of a specific procedure for manufacturing a core support pallet in accordance with this invention. It is understood, of course, that the composition of, and method for producing, this pallet are exemplary and are not to be considered to limit the invention to the particular composition and operating condition outlined.

Approximately 5 lbs. of amosite asbestos fiber, 4 lbs. of finely divided hydrated lime and 4 lbs. of diatomaceous silica were suspended in approximately 4 parts by weight of water per part of solids and the suspension agitated to obtain a substantially homogeneous dispersion of the materials. A portion of the thus formed slurry was then charged to a mold of substantially rectangular dimensions having a top die provided with a precisely dimensioned half cross section configuration of the foundry core element to be subsequently supported by the body being molded. The charge of slurry was then molded, with dewatering thereof, to a density of approximately 36 lbs. per cu. ft. calculated on the dry basis. At this density the molded body was handleable and was removed from the mold. The molded body was then heated to a temperature of approximately 220° for approximately 45 minutes to remove approximately one third by volume of the water therein. Subsequently the body was placed in an autoclave where it was subjected to steam at 100 p. s. i. g. for 20 hours. Upon removal from the autoclave, the product was dried in an oven at 250° F. for 24 hours. The core supporting depressions in the thus formed pallet were found to have the precise dimensions originally imparted to the body by the molding dies. The correspondingly dimensioned sand core was placed in its supporting cavity and then the assembly was subjected to the core curing conditions of 300° F. for 2 minutes in a conventional dielectric oven. After cure, the core was found to have the precise dimensions required of it, and no sagging or other change in dimensions of the core due to the configuration of the pallet were found.

It will be appreciated that the pallet of this invention can be formed with any suitable density for the service intended. Preferably, such products should have a density within the range of approximately 20–70 lbs. per cu. ft., and the most suitable core supports from the standpoint of handleability and multiple service usage have been formed with a density within the range of approximately 30–60 lbs. per cu. ft.

In order to better preserve the surface and dimensions of the support pallet, it has been found advanageous to subject the body to a surface treatment which substantially hardens the surface and minimizes dusting thereof. Any suitable conventional surface hardening wherein the surface is coated with a hard film forming material treatment may be employed. Preferably, the body is surface treated by coating it with linseed oil or other drying oils, and then baking the coating. The body may also be treated with the inorganic surface hardening coating method disclosed in the copending application of Parry and Plauka, Serial No. 382,877, filed September 28, 1953, now United States Patent No. 2,766,140, wherein such bodies are provided with an inorganic coating by initially coating the surface thereof with an alkali metal borophosphate solution and then with a solution of magnesium or zinc silicofluoride. These coatings are applied to the bodies after they have been removed from the autoclave and dried to a substantially dry state, i. e., at least to a stage where the body does not appear wet to an observer.

It will be appreciated that the invention defined herein is not restricted to the formation of foundry core support pallets. Obviously, the invention described and claimed herein may be employed in the formation of molded bodies of fiber reinforced hydrous calcium silicate for any service where it is desired that the final product have the precise dimensions imparted to it during the molding procedure. If desired, conventional structural panels of such compositions may be formed using the procedure of this invention in order to obtain uniform thicknesses thereof after drying. Production of such panels with uniform thicknesses eliminates the necessity of sanding the surfaces thereof if the thickness dimension must be maintained consistent.

It will be understood that details given herein are for the purpose of illustration, not restriction, and that variations within the spirit of the invention are intended to be included in the scope of the appended claims.

What we claim is:

1. The method of restraining dimensional changes in precisely molded, fiber reinforced calcium silicate bodies during steam curing which comprises forming an aqueous slurry containing staple reinforcing fiber, finely divided lime and finely divided siliceous aggregate, molding and dewatering said slurry to produce a handleable, precisely dimensioned body having a wet density equivalent to a dry density within the range of approximately 20–70 lbs. per cu. ft., drying the thus molded body to remove approximately 10–50% by volume of the water therein, then curing the partially dried, molded body by exposing the same to steam at elevated temperatures and pressures to develop a hydrous calcium silicate matrix therein, and then drying the cured body.

2. The method of restraining dimensional changes in precisely molded, fiber reinforced calcium silicate bodies during steam curing which comprises forming an aqueous slurry containing staple reinforcing fiber, finely divided lime and finely divided siliceous aggregate in a $CaO/SiO_2$ mol ratio of approximately 0.6–1 to 1–1.5, molding and dewatering said slurry to produce a handleable, precisely dimensioned body having a wet density equivalent to a dry density within the range of approximately 20–70 lbs. per cu. ft., drying the thus molded body to remove approximately 10–50% by volume of the water therein, then curing the partially dried, molded body by exposing the same to steam at elevated temperatures and pressures to develop a hydrous calcium silicate matrix therein, and then drying the cured body.

3. The method of restraining dimensional changes in a precisely molded foundry core support pallet during steam curing which comprises forming an aqueous slurry containing staple reinforcing fiber, finely divided lime and finely divided siliceous aggregate, molding and dewatering said slurry to produce a handleable, precisely dimensioned body having a wet density equivalent to a dry density within the range of approximately 20–70 lbs. per cu. ft. and a surface impressed with the configuration of the core to be supported, drying the thus molded body to remove approximately 10–50% by volume of the water therein, then curing the partially dried, molded body by exposing the same to steam at elevated temperatures and pressures to develop a hydrous calcium silicate matrix therein, and then drying the cured body.

4. The method of restraining dimensional changes in a precisely molded foundry core support pallet during steam curing which comprises forming an aqueous slurry containing staple reinforcing fiber, finely divided lime and finely divided siliceous aggregate in a $CaO/SiO_2$ mol ratio of approximately 0.6–1 to 1–1.5, molding and dewatering said slurry to produce a handleable, precisely dimensioned body having a wet density equivalent to a dry density within the range of approximately 20–70 lbs. per cu. ft. and a surface impressed with the configuraton of the core to be supported, drying the thus molded body to remove approximately 10–50% by volume of the water therein, then curing the partially dried, molded body by exposing the same to steam at elevated temperatures and pressures to develop a hydrous calcium silicate matrix therein, and then drying the cured body.

5. The method of restraining dimensional changes in precisely molded, fiber reinforced calcium silicate bodies during steam curing which comprises forming an aqueous slurry containing staple reinforcing fiber, finely divided lime and finely divided silceous aggregate, molding and dewatering said slurry to produce a handleable, precisely dimensioned body having a wet density equivalent to a dry density within the range of approximately 20–70 lbs. per cu. ft., drying the thus molded body to remove approximately 10–50% by volume of the water therein, then curing the partially dried molded body by exposing the same to steam at elevated temperatures and pressures to develop a hydrous calcium silicate matrix therein, drying the cured body, and coating the surface of said body with a hard film forming material.

6. The method of restraining dimensional changes in precisely molded, fiber reinforced calcium silicate bodies during steam curing which comprises forming an aqueous slurry containing staple reinforcing fiber, finely divided lime and finely divided siliceous aggregate, molding and dewatering said slurry to produce a handleable, precisely dimensioned body having a wet density equivalent to a dry density within the range of approximately 20–70 lbs. per cu. ft., drying the thus molded body to remove approximately 10–50% by volume of the water therein, then curing the partially dried, molded body by exposing the same to steam at elevated temperatures and pressures to develop a hydrous calcium silicate matrix therein, drying the cured body, coating the surface of said body with a drying oil and baking said oil coating.

7. The method of restraining dimensional changes in precisely molded, fiber reinforced calcium silicate bodies during steam curing which comprises forming an aqueous slurry containing staple reinforcing fiber, finely divided lime and finely divided siliceous aggregate, molding and dewatering said slurry to produce a handleable, precisely dimensioned body having a wet density equivalent to a dry density within the range of approximately 20–70 lbs. per cu. ft., drying the thus molded body to remove approximately 10–50% by volume of the water therein, then curing the partially dried, molded body by exposing the same to steam at elevated temperatures and pressures to develop a hydrous calcium silicate matrix therein, substantially drying the cured body, coating the surface of said body with an initial coating of an alkali metal borophosphate solution and a subsequent coating of a solution of a salt selected from the group consisting of magnesium and zinc silicofluorides, and drying the coated body.

8. The method of restraining dimensional changes in precisely molded, fiber reinforced calcium silicate bodies during steam curing which comprises forming an aqueous slurry containing staple reinforcing fiber in amount approximately 10–70% by weight of solids and finely divided lime and finely divided siliceous aggregate in a CaO/SiO$_2$ mol ratio of 0.6–1 to 1–1.5, molding and dewatering said slurry to produce a handleable, precisely dimensioned body having a wet density equivalent to a dry density within the range of approximately 20–70 lbs. per cu. ft., drying the thus molded body to remove approximately 10–50% by volume of the water therein, then curing the partially dried, molded body by exposing the same to steam at elevated temperatures and pressures to develop a hydrous calcium silicate matrix therein, and then drying the cured body.

9. The method of restraining dimensional changes in precisely molded, fiber reinforced calcium silicate bodies during steam curing which comprises forming an aqueous slurry containing asbestos fiber in amount approximately 25–50% by weight of solids and the remainder approximately equivalent reactive amounts of finely divided lime and diatomaceous silica, molding and dewatering said slurry to produce a handleable, precisely dimensioned body having a wet density equivalent to a dry density within the range of approximately 30–60 lbs. per cu. ft., drying the thus molded body to remove approximately 10–50% by volume of the water therein, then curing the partially dried, molded body by exposing the same to steam at elevated temperatures and pressures to develop a hydrous calcium silicate matrix therein, and then drying the cured body.

10. The method of restraining dimensional changes in a precisely molded foundry core support pallet during steam curing which comprises forming an aqueous slurry containing asbestos fiber in amount approximately 25–50% by weight of solids and the remainder approximately equivalent reactive amounts of finely divided lime and diatomaceous silica, molding and dewatering said slurry to produce a handleable, precisely dimensioned body having a wet density equivalent to a dry density within the range of approximately 30–60 lbs. per cu. ft. and a surface impressed with the configuration of the core to be supported, drying the thus molded body to remove approximately 10–50% by volume of the water therein, then curing the partially dried, molded body by exposing the same to steam at elevated temperatures and pressures to develop a hydrous calcium silicate matrix therein, and then drying the cured body.

References Cited in the file of this patent

UNITED STATES PATENTS

| | | |
|---|---|---|
| 656,696 | Johnson | Aug. 28, 1900 |
| 1,045,933 | Belknap | Dec. 3, 1912 |
| 1,204,086 | Sutcliffe | Nov. 7, 1916 |
| 1,520,893 | Teitsworth | Dec. 30, 1924 |
| 2,540,354 | Selden | Feb. 6, 1951 |